Sept. 27, 1966

S. J. SHEHEEN 3,275,926

DIRECT CURRENT CONTROL SYSTEMS

Filed Oct. 1, 1962

INVENTOR.
SHAY J. SHEHEEN

BY *Richard D. Stephens*

ATTORNEY

Sept. 27, 1966  S. J. SHEHEEN  3,275,926
DIRECT CURRENT CONTROL SYSTEMS
Filed Oct. 1, 1962  2 Sheets-Sheet 2
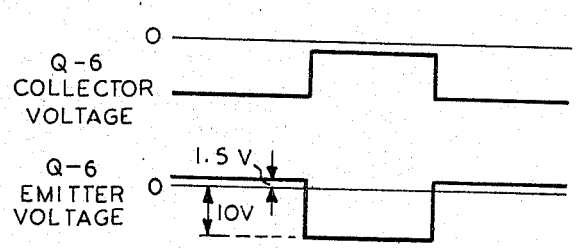
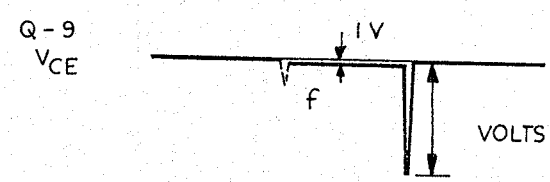
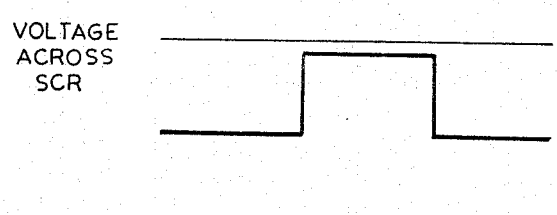
FIG. 5
FIG. 4
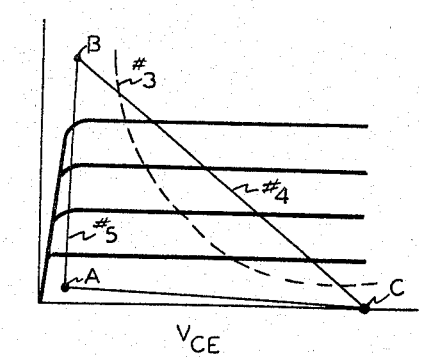
INVENTOR.
SHAY J. SHEHEEN
BY Richard L. Stephens
ATTORNEY

United States Patent Office 3,275,926
Patented Sept. 27, 1966

3,275,926
DIRECT CURRENT CONTROL SYSTEMS
Shay J. Sheheen, Freeville, N.Y., assignor to The Raymond Corporation, Greene, N.Y., a corporation of New York
Filed Oct. 1, 1962, Ser. No. 227,270
7 Claims. (Cl. 323—18)

This invention relates to direct current control systems in general, to direct current motor control systems, and more particularly, to an impoved, efficient system for substantially stepless current control of an electric motor or like device requiring the supply of a variable direct current. In the electric motor arts generally, and especially in electric motor applications for traction motors, hoists, cranes and the like, a need exists for efficient, economical stepless motor speed control systems. In a variety of mateirals handling equipment it is usual to supply much or all of the operating power from electric storage batteries. Such batteries, commonly supplying energy at 24 volts, for example, operate D.C. motors to propel lift trucks, to operate hydraulic pumps, and to perform a variety of similar functions. In order to provide large starting torque in a small package, such systems generally employ series D.C. motors. Speed control of a D.C. series motor commonly has been obtained in the prior art by a form of amplitude modulation, the varying of the voltage applied to the motor, most commonly by inserting and then successively shorting out a plurality of accelerating resistors in series with the motor. Unless an extremely large number of finely graduated accelerating resistors are provided, which also requires many contactor switches, motor acceleration frequently is not smooth. Acceleration is especially jerky, of course, under light load conditions. A heavy load sometimes provides enough inertia to provide smooth acceleration, but then power dissipation during acceleration is especially high. Secondly, if a motor system frequently operates in "stop and go" fashion, with frequent stopping and reversals, a large amount of power is dissipated in the accelerating resistors. Thirdly, series motor efficiency itself is a function of motor rated voltage, and because low motor voltage results in low motor efficiency, the overall efficiency in a device such as a lift truck may be very low. In the case of a lift truck, low efficiency limits the number of hours a truck can be used before it must be taken out of service to recharge its batteries. Similar problems attend a number of other battery-fed electric systems.

Because such speed control by variation of the applied voltage results in the abovedescribed waste of energy, various attempts have been made in the prior art to vary the amount of energy applied from the power source to the motor supplied therefrom by semiconductor switching circuits. Such prior art attempts have involved either "pulse width modulation" or "time ratio control." Pulse width modulation is intended to embrace those systems which provide current pulses of varying width at a constant repetition rate to the motor, while time ratio control is intended to mean those systems which provide current pulses to the motor with a uniform width at a varying repetition rate. Various semiconducting switching circuits controlled in both modes are known in the art. Power transistors are limited in their current and voltage ratings, and many applications requiring control of large currents at rather high voltages are impossible with power transistors.

One fairly recent motor control system which has proven to have considerable merit is the pulse width modulation system utilizing power transistors as switches, as shown in my copending application Serial No. 218,211 filed August 15, 1962. While this system has shown remarkable advantages over most prior art systems, it usually requires the use of a plurality of power transistors connected in parallel, a rather large number of such transistors being required in motor systems which require heavy currents. In power transistor systems wherein a plurality of power transistors are connected in parallel to provide adequate load current, it usually is necessary to utilize a large safety factor because of unequal division of the load current though the transistors. Manufacturers usually do not specify transconductance ratings of power transistors. Equal division of currents is not easily obtained even with equal beta ratings or with inefficient emitter resistances. Furthermore, since infinite heat sinks and zero thermal resistance are difficult to achieve, further derating, and a consequent increase in the number of transistors needed for a given load current is generally deemed necessary. A decrease in the number of transistors required to be parallel alleviates this problem.

Because a silicon controlled rectifier is inherently capable of handling much larger currents than a transistor, various current control systems using silicon controlled rectifiers have been devised, both of the pulse width modulation type and the time ratio control type. Controlled rectifiers operate in a manner similar to thyratrons, in that the control electrode or gate lead essentially loses control once the device begins to conduct, and the voltage across the rectifier must be lowered in order to cut off the device. An SCR operates much like an ordinary rectifier which has been modified to block in the forward direction until a small signal is applied to the gate lead. After the gate signal is applied, the SCR conducts in the forward direction with a forward characteristic very similar to that of an ordinary rectifier, and it will continue conduction even after the gate signal is removed. An SCR has characteristics very similar to those of a thyratron, except that the forward drop is about one-tenth that of a thyratron, and the deionization time is less by orders of magnitude. Inasmuch as the SCR is a PNPN device, the back resistance characteristic of the SCR is much like that of two ordinary silicon diodes in series, providing a high back resistance, of the order of megohms. In some prior art controlled rectifier systems for use in direct current circuits the inverse voltage needed to turn off the rectifier at the end of each pulse has been obtained by means of resonant L-C charging circuits, using an autotransformer and a capacitor in association with the circuit load. Such circuits are disadvantageous not only because they require a sizeable transformer and a sizeable capacitor, but also because the circuit load must bear a predetermined relationship to the L-C charging circuit, so that the resonant circuit remains underdamped, and further, because the rectifier turn off time varies with load. In another prior art controlled rectifier circuit, a plurality of power transistors are connected in parallel with the controlled rectifier, to turn off the rectifier by shunting it with a very low impedance to reduce the rectifier current to a low value. In order to reduce rectifier current sufficiently to turn it off, the shunt power transistors must have saturation resistance much less than that of the rectifier, and hence a large number of power transistors may be required. Also, in such an arrangement, the maximum permissible operating voltage across the controlled rectifier then must be limited to be no more than the breakdown voltage of the transistors, thereby losing the advantage of the higher voltage rating of the controlled rectifier.

Thus it is a primary object of the present invention to provide an improved D.C. current control system capable of controlling large currents, at higher voltages, with minimum power dissipation and with a decreased number of components.

It is a more specific object of the invention to provide a direct current control system of either the pulse width modulation type or time ratio control type in which a fewer number of power transistors are required to control a given load current.

Other objects of the invention will in part be obvious and will in part appear hereinafter.

The invention accordingly comprises the features of construction, combination of elements, and arrangement of parts, which will be exemplified in the construction hereinafter set forth, and the scope of the invention will be indicated in the claims.

For a fuller understanding of the nature and objects of the invention reference should be had to the following detailed description taken in connection with the accompanying drawings in which:

FIG. 4 is a diagram of typical power transistor characteristics useful in understanding the operation of power transistor Q–9 of FIG. 1; and FIG. 5 is a group of waveforms illustrating various currents and voltages associated with the circuit of FIG. 1.

Figure 1:
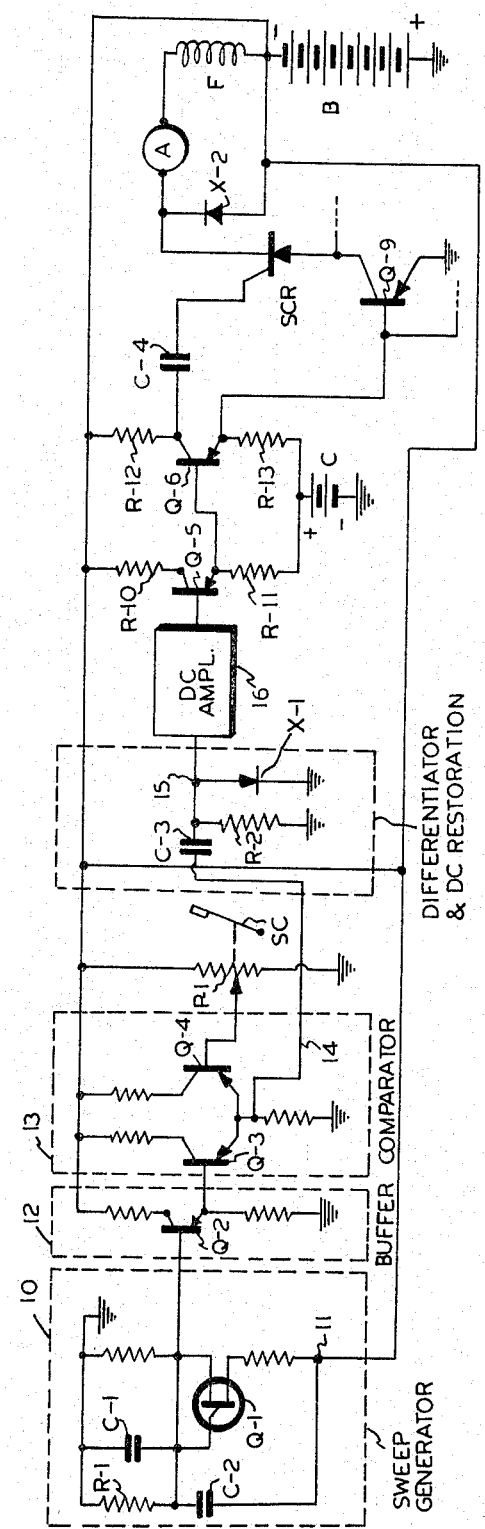
FIG. 1 is an electrical schematic diagram illustrating one practical embodiment of the invention connected to drive a series D.C. motor.

In FIG. 1 a very simple sweep generator shown within dashed lines at 10 comprises a unijunction transistor Q–1 which provides a recurrent ramp or sawtooth voltage at a constant frequency determined by the time constant of resistor R–1 and capacitor C–2, a frequency of 1000 c.p.s. being typical. As soon as power is connected to terminal 11 from the power supply (shown as comprising battery B), capacitor C–2 begins to charge up at a rate determined by resistor R–1 and capacitor C–2. When the voltage across capacitor C–2 reaches certain value, unijunction transistor Q–1 conducts, discharging capacitor C–2. A unijunction transistor consists of a bar of n type silicon with an ohmic contact at each end, designated as first and second base contacts, and a third connection, designated the emitter, is made near one end through a small amount of p type material, providing a rectifying function. The unijunction transistor possesses a highly-stable negative-resistance characteristic which makes it useful in a variety of pulse generator circuits. For a more detailed explanation of the use of the unijunction transistor in such circuits, reference may be had to pp. 58 et seq. of "Electronics" May 1962, McGraw-Hill, New York. Upon conduction of unijunction transistor Q–1 and consequent discharge of capacitor C–2, the sweep generator is at its original condition and another cycle occurs. Four cycles of the sweep generator output voltage at the emitter of transistor Q–1 are shown plotted in FIG. 2.

The constant repetition rate ramp voltage output from the emitter of transistor Q–1 of the sweep generator is applied via a conventional emitter follower isolation amplifier 12 including transistor Q–2 to a comparator circuit 13 comprising transistors Q–3 and Q–4. In the absence of any input signal to comparator 13 from buffer amplifier 12, the voltage on the emitters of Q–3 and Q–4 will be seen to be determined by the adjustment of the wiper arm of potentiometer P–1, which is shown by way of example as connected to be positioned manually by actuation of the vehicle speed control lever SC. The base-emitter junction of Q–4 will be forward biased, and the voltage on line 14 will closely approximate that on the wiper of potentiometer P–1. The base-emitter junction of Q–3 will be seen to be reverse-biased, so that Q–3 will be cut off.

Figure 2:
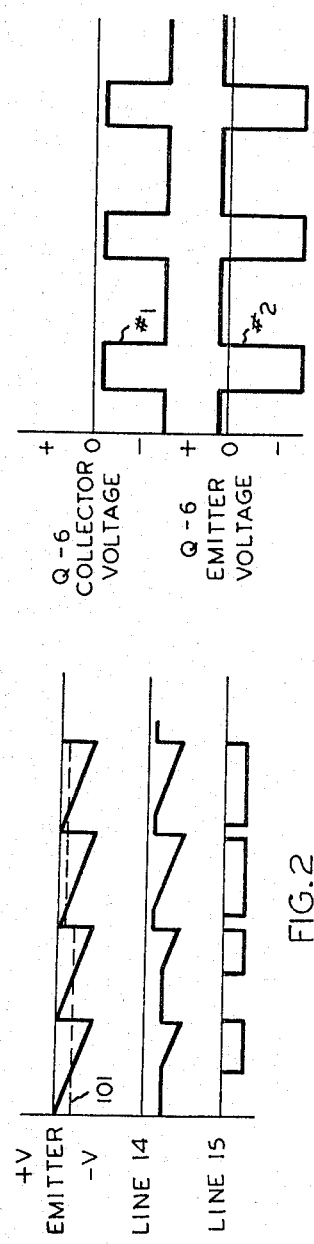
FIG. 2 is a waveform diagram useful in understanding the operation of the pulse width modulator portion of FIG. 1.

Assume that potentiometer P–1 is adjusted so that the voltage indicated by dashed line 101 in FIG. 2 is present on line 14. As the negative-going sawtooth voltage from Q–2 is applied to the base of Q–3, nothing happens until the base of Q–3 becomes more negative than the Q–4 emitter voltage, at which time the base-emitter junction of Q–3 becomes forward biased, so that Q–3 conducts.

It will be seen that while the pulse width is shown as being determined by the speed reference voltage applied to the comparator from the wiper of potentiometer P–1, in some forms of the invention the speed reference voltage may be provided by devices other than a manually-adjusted potentiometer. For example, in some motor control systems constructed in accordance with the invention the speed reference voltage may be provided in part or altogether by a conventional tachometer generator or by some other voltage signal producing device responsive to a condition and operative to provide a voltage which varies as a function of desired motor speed.

The ramp voltage pulses of selected width and constant repetition rate on line 14 are applied through an conventional RC differentiating circuit comprising capacitor C–3 and resistor R–2, which converts the ramp pulses to rectangular pulses having a time width corresponding to that of the ramp voltages on line 14, and having very steep, substantially vertical leading and trailing edges. Diode X–1 clips off the positive-going spikes which occur at the end of each pulse and references the negative-going pulses on line 15 to ground, thereby providing a D.C. restoration function. The time-modulated rectangular pulses on line 15 are amplified by means of conventional direct-coupled amplifier stages shown in block form at 16 to provide an input signal to a driver amplifier stage comprising transistor Q–5. The rectangular pulses on line 15 are D.C.-restored, or referenced to ground, in order that the amplitude of the pulse fed to amplifiers 16 be constant rather than varying with pulse width.

Figure 3:
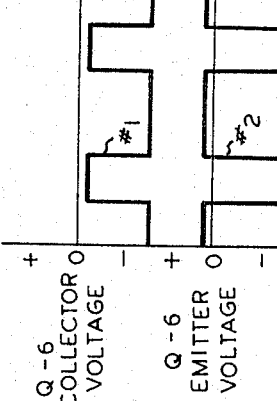
FIG. 3 is a further waveform diagram useful in understanding the operation of driver amplifier Q–6 of FIG. 1.

The series motor field winding F and armature A are connected from the power supply terminal 11 to ground, to which the positive terminal of the power supply is connected, through a novel series circuit including a silicon controlled-rectifier SCR and a transistor Q–9. The SCR, Q–9 combination functions as a switch which has either a very high resistance or a very low resistance, depending upon the signals applied to the combination by driver transistor Q–6. Dashed lines shown in FIG. 1 connected to the base and emitter of power transistor Q–9 represent that additional power transistors may be paralleled with Q–9, with the number depending, of course, on the maximum current required by the load. When an amplified negative-going rectangular pulse is applied to the base of transistor Q–5, the negative-going pulse at the emitter of Q–5 drives the base of transistor Q–6, providing a negative-going pulse from the emitter of Q–6 to the base of transistor Q–9, and applying a positive-going pulse from the collector of Q–6 via coupling capacitor C–4 to the control electrode or gate lead of controlled rectifier SCR. The positive-going pulses applied from the Q–6 collector via capacitor C–4 to the SCR control electrode are shown as waveform #1 in FIG. 3, and the negative-going pulses applied from the Q–6 emitter to the Q–9 base are shown as waveform #2. The negative-going pulses applied to the base of transistor Q–9 saturates transistor Q–9, making its impedance very low, and substantially simultaneously the positive-going pulse applied to SCR turns it on, making its impedance very low. Thus the application of the negative pulse to driver transistor Q–6 turns on the switch formed by the SCR, Q–9 series circuit, connecting substantially the full power supply voltage across the motor for the duration of the pulse. When the transistor Q–9 and SCR impedances are high, during the initial portion of a sweep generator cycle, the motor is effectively disconnected from the ground return circuit. Since the width of the rectangular pulses on line 15 is determined by the speed reference voltage, the time each sweep generator cycle that voltage is applied across the motor is determined by the speed reference voltage, thereby determining the time average current through the motor, the average motor torque and the motor speed.

It will be seen that during the "no pulse" interval, when both power transistor Q-9 and rectifier SCR are off, that no appreciable current will be flowing through transistor Q-9, and that because the SCR cutoff impedance is substantially greater than that of Q-9, most of the voltage drop across the Q-9, SCR series combination will exist across SCR. Inasmuch as the SCR is a PNPN device, the back resistance characteristic of the SCR is much like that of two ordinary silicon diodes in series, providing a high back resistance, of the order of megohms. Thus during the no pulse interval, with both current through Q-9 small and voltage across Q-9 small, there will be minimum power dissipation in transistor Q-9. During a pulse interval, when both Q-9 and SCR are conducting heavily, transistor Q-9 is saturated, so that only a low voltage exists between its collector and emitter, even though a heavy current flows through the transistor. Because the voltage drop across the transistor is low, the power dissipation in the transistor is low. Thus there is low power dissipation in transistor Q-9 during both the pulse intervals and the no pulse intervals.

Considerable power dissipation might occur in transistor Q-9, however, during the transient conditions which occur at the leading and trailing edges of the driving pulses. For example, when the positive-going trailing edge of the driving pulse occurs, the collector to emitter resistance of Q-9 increases, increasing the voltage drop across Q-9 and the power dissipation in Q-9. It is well known in the power transistor switching art that maximum dissipation occurs during the transitions between "full on" and "full off" conditions, and thus it is universally regarded as desirable to provide driving pulses having extremely steep leading and trailing edges, so that the power transistors operate under high power dissipation conditions for instants which are as brief as possible. Even when using extremely steep driving pulses with very short rise and fall times, it frequently has been necessary in the prior art to parallel a rather large number of power transistors in order that the power dissipation occurring during the switching transitions not destroy the transistors.

Because the collector-emitter circuit of power transistor Q-9 is in series with controlled rectifier SCR, through which all motor current flows, one might assume naturally that the maximum amount of current which the motor could draw would be drastically limited by the rather modest power dissipation rating of transistor Q-9. It has been discovered, however, that transistor Q-9 can be operated safely at considerably higher currents than its expected rating, since transistor Q-9 passes through the high dissipation portion of its operating characteristic only when it is being turned off, and not when it is being turned on. Since transistor Q-9 makes only half as many excursions through its high dissipation region as an ordinary power transistor switch, a considerably higher current may be handled during such excursions without thermal destruction of transistor Q-9, and hence many fewer power transistors need be paralleled in order to supply a given load current.

As indicated in FIG. 1, a fixed positive bias, shown as being derived by battery C and resistor R-13, is applied to the base of transistor Q-9, the value of this bias being determined so as to insure that Q-9 will be driven slightly past cutoff immediately at the end of each negative driving pulse applied from the emitter of driver transistor Q-6. Provision of such a bias to insure that Q-9 will be driven past cutoff insures that there will be minimum dissipation in transistor Q-9 throughout the "no pulse" intervals between driving pulses. In general such reverse bias operation of transistors has been avoided in the prior art, since ordinarily, reverse biasing a transistor sometimes gives it a negative-resistance high-dissipation region of operation, so that turning off the transistor with a low value of load resistance sometimes can result in sustained operation in the negative-resistance high-dissipation region and cause thermal runaway and consequent destruction of the transistor. In the present invention, however, when the positive-going trailing edge of the driving pulse turns off transistor Q-9, the voltage drop increases across Q-9 and decreases the current through SCR, shutting off SCR so that the load seen by transistor Q-9 drastically decreases. The shutting off of the SCR effectively changes the transistor load line, making it so steep that the negative-resistance high-dissipation region of operation is entirely avoided, and hence reverse bias may be employed in the invention to provide minimum "no pulse" or off condition dissipation without encountering the thermal runaway which might otherwise result.

In FIG. 4, the characteristics of a typical power transistor are illustrated by a plot of collector current $I_c$ versus voltage drop across the transistor ($V_{ce}$) for several values of base current. Superimposed on these characteristic curves are a dashed line #3 indicating a constant (maximum permissible) power dissipation, a first load line #4 indicating the load seen by transistor Q-9 when the SCR is switched on, and a second load line #5 indicating the load seen by Q-9 when the SCR is turned off, so that it inserts a much higher resistance in series with Q-9. As will be evident, low dissipation operation of transistor Q-9 requires operation to the left of or below line #3, and operation to the right of or above curve #3 for any sustained lengths of time would destroy the transistor.

During the no-pulse interval, when transistor Q-9 is biased beyond cutoff and SCR is cutoff, transistor Q-9 is operating at point A in FIG. 4, which is well within the maximum dissipation limit indicated by curve #3. Upon occurrence of a driving pulse, transistor Q-9 conditions change in accordance with line #5, so that transistor Q-9 becomes saturated, but with low collector voltage across it, until the condition at point B is reached. As the SCR turns on, however, the load line seen by transistor Q-9 is that indicated as line #4, but transistor Q-9 remains near point B for the duration of the pulse interval. At the end of the pulse interval, SCR and Q-9 are both conducting heavily, and as transistor Q-9 is turned off, it passes through the conditions illustrated by load line #4, going from near point B toward point C. It is this transition, which passes above and to the right of curve #3, which contributes substantially all of the power dissipation which occurs in transistor Q-9 in the invention, and hence it is important to make driving pulse *trailing* edges as steep as possible, so that the high dissipation region will be passed through in as short a time as possible. As operating conditions progress along line #4 from point B toward point C, the rise in impedance (and voltage drop) across transistor Q-9 eventually decreases the current through SCR to a point where SCR cuts off, immediately making transistor Q-9 subject to the steep load line characteristics of load line #5 in lieu of the flat load line characteristic of load line #4, so that upon cutoff of SCR, transistor Q-9 operation is back near point A. Now it should be clearly understood that because transistor Q-9 "turn on" follows the switching path C toward A toward B, rather than from C directly along line #4 to B, that transistor Q-9 does not pass through the high dissipation operation region when it is turned on, but only when it is turned off. Therefore, transistor Q-9 tends to dissipate about one half as much power as it otherwise would, and many fewer transistors need be paralleled to supply a given load current requirement.

In a typical application, for use with 50 ampere loads, a General Electric Type C6OU silicon controlled rectifier was used with a pair of paralleled Clevite Type CTP3544 transistors having a maximum collector current rating of 25 amperes. The transistor reverse bias rating was 45 volts, and the SCR peak inverse voltage rating was 50 volts. Such a circuit may easily handle currents of 50 amperes with hardly a discernible rise in transistor temperature from ambient temperature. In FIG. 5 the voltages observed across portions of such a circuit are shown, and are labelled sufficiently that no detailed explanation of each waveform need be set forth. In the waveform showing the voltage $V_{ce}$ across Q-9, a small spike shown in dashed lines at $f$ represents a voltage which occurs due to inductive kick if an inductive load is fed by the circuit, and no such spike occurs if the load is purely resistive. The small spike having an amplitude about 20% of the turn off voltage excursion, is for a typical series motor load. In the Q-9 collector current waveform, dashed lines also indicate the nature of the rounding off of the current pulse which an inductive load will cause.

While the invention has been illustrated using a pulse width modulator, it will be apparent to those skilled in the art that a time ratio pulse generator may be substituted without departing from the invention. Furthermore, while a specific commercially available *silicon* controlled rectifier has been mentioned in this disclosure, it will be apparent that controlled rectifiers using other elements may be substituted if available, and hence the term controlled rectifier is intended to specify any device having operating characteristics similar to the PNPN silicon controlled rectifier described above.

It will thus be seen that the objects set forth above, among those made apparent from the preceding description, are efficiently attained, and since certain changes may be made in the above construction without departing from the scope of the invention, it is intended that all matter contained in the above description or shown in the accompanying drawings shall be interpreted as illustrative and not in a limiting sense.

Having described my invention, what I claim as new and desire to secure by Letters Patent is:

1. A direct current control circuit, comprising, in combination: a direct current source; a PNPN semiconductor controlled-rectifier having an anode, a cathode and a control electrode; a first transistor having a base electrode and collector and emitter terminals; a load circuit, said source, said load circuit, the anode-cathode circuit of said controlled rectifier, and the collector and emitter terminals of said transistor all being connected in a closed series loop; and means for providing substantially rectangular driving pulses periodically to said control electrode of said controlled-rectifier and to said base electrode of said transistor to cause said transistor and said controlled-rectifier to begin to conduct substantially simultaneously at the beginning of each driving pulse, and to interrupt current flow in said closed series loop at the end of each driving pulse.

2. A control circuit according to claim 1 including means for applying a fixed reverse bias potential to reverse bias said base electrode with respect to said emitter terminal in the absence of one of said driving pulses being applied to said base electrode of said transistor.

3. Apparatus according to claim 1 in which said means for providing driving pulses includes means for deriving substantially rectangular pulses of controllable width and driver amplifier means responsive to said pulses of controllable width for applying said driving pulses to said control electrode of said controlled-rectifier and to said base electrode of said transistor to switch on current flow in said series loop in accordance with the width of said rectangular pulses of controllable width.

4. Apparatus according to claim 1 in which said emitter terminal is connected to a point of reference potential, in which said means for providing driving pulses includes a driver amplifier stage having a second transistor and means for providing substantially rectangular pulses of controllable width, said second transistor having collector and emitter terminals and a base electrode; means for applying a fixed bias voltage between said base electrode and said emitter terminal of said first transistor; circuit means directly connecting one of said terminals of said second transistor to the base electrode of said first transistor; and capacitor means for coupling the other of said terminals of said second transistor to said control electrode of said controlled-rectifier.

5. A direct current control circuit, comprising, in combination: a direct current source; a controlled rectifier having an anode, a cathode and a control electrode; a first transistor having a base electrode and collector and emitter terminals; a direct current load, said source, said load, the anode-cathode circuit of said controlled rectifier, and the collector and emitter terminals of said transistor all being connected in a closed series loop; and means for providing periodic driving pulses to said control electrode of said controlled rectifier and to said base electrode of said transistor to turn said controlled rectifier and said transistor on substantially simultaneously at the beginning of each said driving pulse and off in sequence, said controlled rectifier being turned off by decrease of current flow through said transistor at the end of each said driving pulse, thereby to vary the average current supplied to said load.

6. Apparatus according to claim 5 in which said means for providing driving pulses includes means for deriving substantially rectangular pulses of controllable width, and driver amplifier means responsive to said pulses of controllable width for applying said driving pulses to said control electrode of said controlled rectifier and to said base electrode of said transsitor.

7. A direct current control circuit, comprising, in combination: a direct current source; a semiconductor controlled rectifier having an anode, a cathode, and a control electrode, said control electrode being capable of controlling the anode-cathode voltage at which said controlled rectifier begins to conduct and thereafter substantially losing control over the current through said controlled rectifier; a transistor having a base electrode and collector and emitter terminals, the back resistance of the anode-cathode circuit of said controlled rectifier being greater than the back ressitance of the collector-emitter circuit of said transistor; a load circuit, said source, said load circuit, the anode-cathode circuit of said controlled rectifier and the collector-emitter circuit of said transistor all being connected in a closed series loop circuit; and means for providing periodic driving pulses to said control electrode and to said base electrode to turn on current to said load circuit at the beginning of each said driving pulse and to turn off current in said load circuit at the end of each said driving pulse.

References Cited by the Examiner

UNITED STATES PATENTS

| 3,009,093 | 11/1961 | Seike | 323—22 |
|---|---|---|---|
| 3,064,175 | 11/1962 | Vergez | 318—341 |
| 3,088,075 | 4/1963 | Pintell | 378—72 |
| 3,132,264 | 5/1964 | Dahme | 307—88.5 |
| 3,165,646 | 1/1965 | De Bottari | 307—88.5 |
| 3,217,176 | 11/1965 | Chin | 307—88.5 |

OTHER REFERENCES

Publication: IBM Technical Disclosure Bulletin, vol. 4, No. 9, February 1962, pp. 54–55.

JOHN F. COUCH, *Primary Examiner.*

ORIS L. RADER, *Examiner.*

S. GORDON, K. D. MOORE, *Assistant Examiner.*